United States Patent
Wang

(10) Patent No.: US 7,216,472 B1
(45) Date of Patent: May 15, 2007

(54) GUIDING SHAFT STRUCTURE FOR CHAIN CONNECTOR

(76) Inventor: Wen-pin Wang, No. 67, Kang Kou, Kang Nan Tsun, An Ting Hsiang, Tainan Hsien (TW)

( * ) Notice: Subject to any disclaimer, the term of this patent is extended or adjusted under 35 U.S.C. 154(b) by 0 days.

(21) Appl. No.: 11/429,993

(22) Filed: May 9, 2006

(51) Int. Cl.
*F16G 5/18* (2006.01)
*F16G 15/06* (2006.01)

(52) U.S. Cl. .................. 59/7; 59/11; 59/35.1; 474/206; 474/218

(58) Field of Classification Search .............. 59/7, 59/11, 35.1; 474/206, 218, 234
See application file for complete search history.

(56) References Cited

U.S. PATENT DOCUMENTS

| | | | |
|---|---|---|---|
| 4,994,945 A * | 2/1991 | O'Shea et al. ............ 59/7 |
| 4,998,907 A * | 3/1991 | Sawada et al. ............ 474/206 |
| 6,966,170 B2 * | 11/2005 | Meggiolan ................ 474/218 |
| 7,082,747 B2 * | 8/2006 | Oishi et al. ............... 59/11 |
| 7,131,258 B2 * | 11/2006 | Meggiolan ................ 59/7 |

* cited by examiner

*Primary Examiner*—David Jones
(74) *Attorney, Agent, or Firm*—Rosenberg, Klein & Lee

(57) ABSTRACT

A guiding shaft structure for a chain connector includes a black shaft and a guiding bolt. The black shaft comprises a passage with a threaded section therein and a first protruding ring, a second protruding ring and a third protruding ring on an outer surface thereof. The guiding bolt comprises an insertion section and a guiding section. The insertion section comprises grooves, a circular flange and a guiding surface. The guiding section comprises a threaded portion. The black shaft and the guiding bolt are secured with each other to form a one piece and to provide a secure connection.

1 Claim, 5 Drawing Sheets

GUIDING SHAFT STRUCTURE FOR CHAIN CONNECTOR

BACKGROUND OF THE INVENTION

1. Field of the Invention

This invention relates to a guiding shaft structure for a chain connector, in particular to one that has a guiding section of a guiding blot connecting to a passage of a black shaft to provide a secure connection.

2. Description of the Prior Art

A conventional connecting pin, as shown in FIG. 5, comprises a connecting element C and a guiding element D. The connecting element C has a through hole C1. The through hole C1 is provided with a stopping portion C2 at the center thereof and a locating section C3. The guiding element D has an insertion end D1 and a pin D2. The pin D2 is inserted and located in the locating section C3. This connection depends on merely the pin D2 and the locating section C3, which is very weak and may be shaken to loosen easily.

When the connecting element C is hammered, the connection of the pin D2 and the locating section C3 may be loosened, causing the locating section C3 to dislocate from a chain. When the insertion end D1 is inserted into a through hole of the chain, the insertion end D1 is flush with the inner wall of the through hole and the burr on the inner wall of the through hole may damage the inner wall, causing unstable connection of the connecting element C within the through hole of the chain.

SUMMARY OF THE INVENTION

It is the primary object of the present invention to provide a guiding shaft structure for a chain connector, which is secure in connection.

It is another object of the present invention to provide a guiding shaft structure for a chain connector, which provides a guiding bolt able to reuse and is cost-effective.

According to the present invention, there is provided a guiding shaft structure for a chain connector comprising a black shaft and a guiding bolt; said black shaft comprising a passage with a threaded section therein and a first protruding ring, a second protruding ring and a third protruding ring on an outer surface thereof; said guiding bolt being connected to said threaded section of said black shaft and comprising an insertion section and a guiding section, said insertion section comprising grooves, a circular flange and a guiding surface, said guiding section comprising a threaded portion.

DETAILED DESCRIPTION OF THE PREFERRED EMBODIMENT

Figure 1:
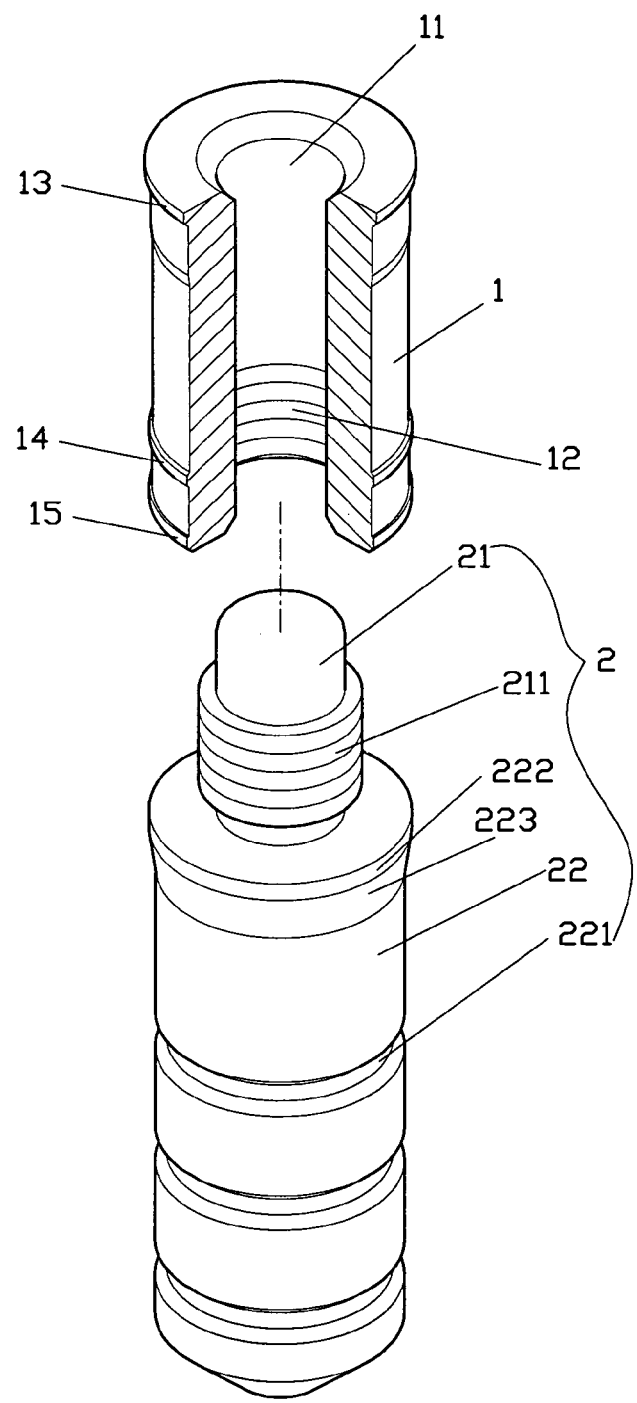
FIG. 1 is an exploded view of the present invention.

As shown in FIG. 1, the present invention comprises a black shaft 1 and a guiding bolt 2.

The black shaft 1 comprises a passage 11 therein. The passage 11 is provided with a threaded section 12. The black shaft 1 further comprises a first protruding ring 13, a second protruding ring 14 and a third protruding ring 15 on an outer surface thereof. The first protruding ring 13 has a diameter that is larger than the second protruding ring 14 and the third protruding ring 15.

The guiding bolt 2 is connected to the passage 11 of the black shaft 1 and comprises a guiding section 21 and an insertion section 22. The guiding section 21 comprises a threaded portion 211 thereon. The insertion section 22 comprises grooves 221, a circular flange 222 and a guiding surface 223.

Figure 2:
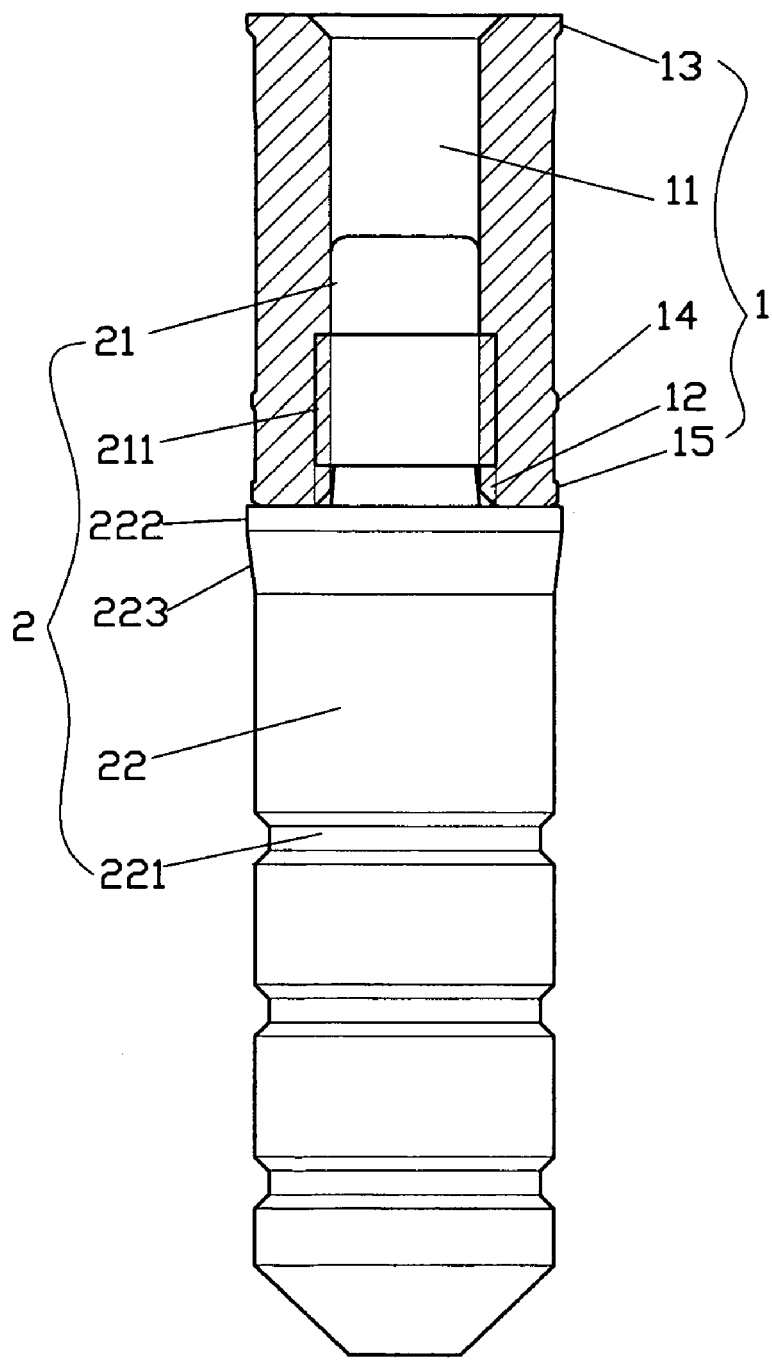
FIG. 2 is a side sectional view of the present invention.

To assemble the present invention, the guiding section 21 of the guiding bolt 2 is inserted into the black shaft 1 with the threaded portion 211 engaging with the threaded section 12, as shown in FIG. 2. The third protruding ring 15 of the black shaft 1 and the circular flange 222 of the guiding bolt 2 are the same width, which increases the contact surface of the circular flange 222 of the guiding bolt 2 and the third protruding ring 15 of the black shaft 1, that will enhance the connection of the black shaft 1 and the guiding bolt 2.

Figure 3:
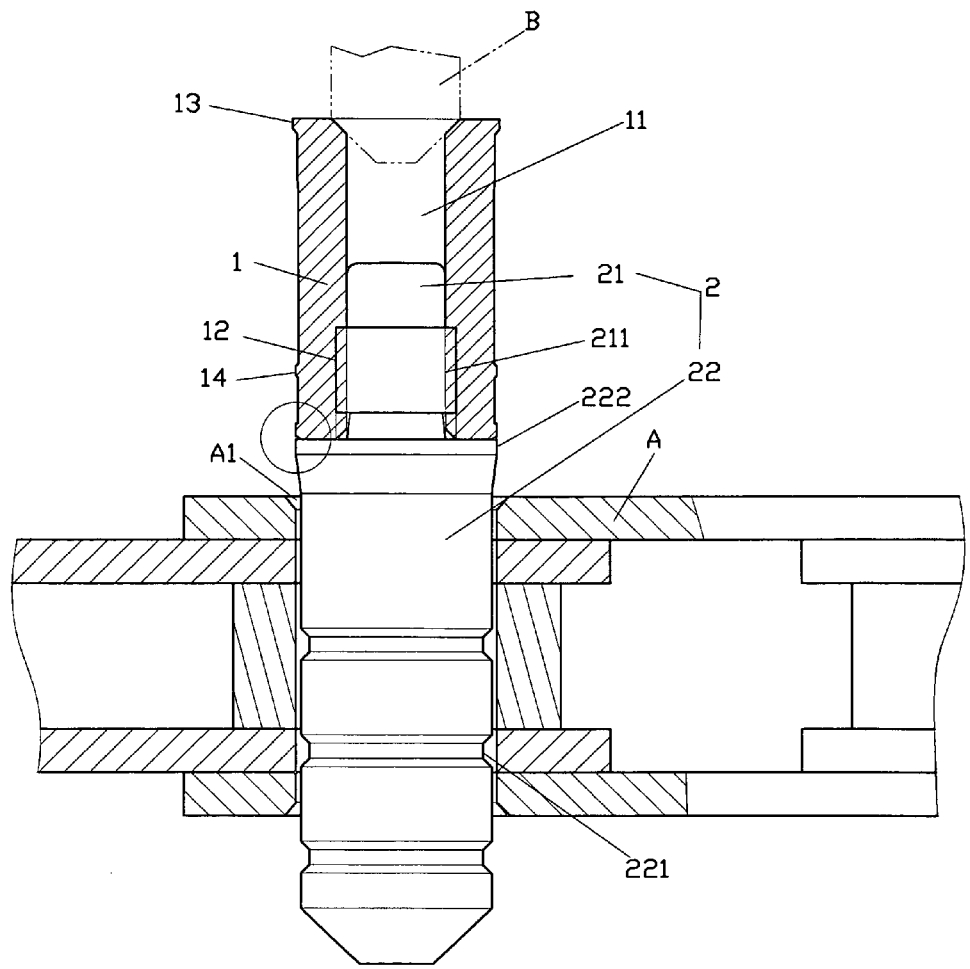
FIG. 3 is a side sectional view showing that the present invention is inserted into a connecting hole of a chain connector.
Figure 3A:
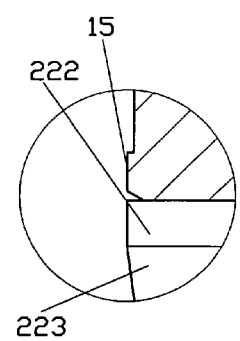
FIG. 3A is an enlarged view of FIG. 3, partially.

To operate the present invention, as shown in FIG. 3, the insertion section 22 of the guiding bolt 2 is inserted into a connecting hole A1 of a chain connector A. A chain tool B is inserted into the passage 11 from the other end where the first protruding ring 13 is and forced to press the insertion section 22 into the connecting hole A1. When the circular flange 222 of the insertion end 22 is squeezed into the connecting hole A1, the friction will scrape the burr on the inner wall of the connection hole A1. The third protruding ring 15 of the black shaft 1 and the circular flange 222 of the guiding bolt 2 are the same width, as shown in FIG. 3A. The guiding surface 223 facilitates the guiding bolt 2 to guide the black shaft 1 into the connecting hole A1. The grooves 221 of the insertion section 22 decrease the contact surface of the insertion section 22 against the inner wall of the connecting hole A1 so as to decrease the friction resistance.

Figure 4:
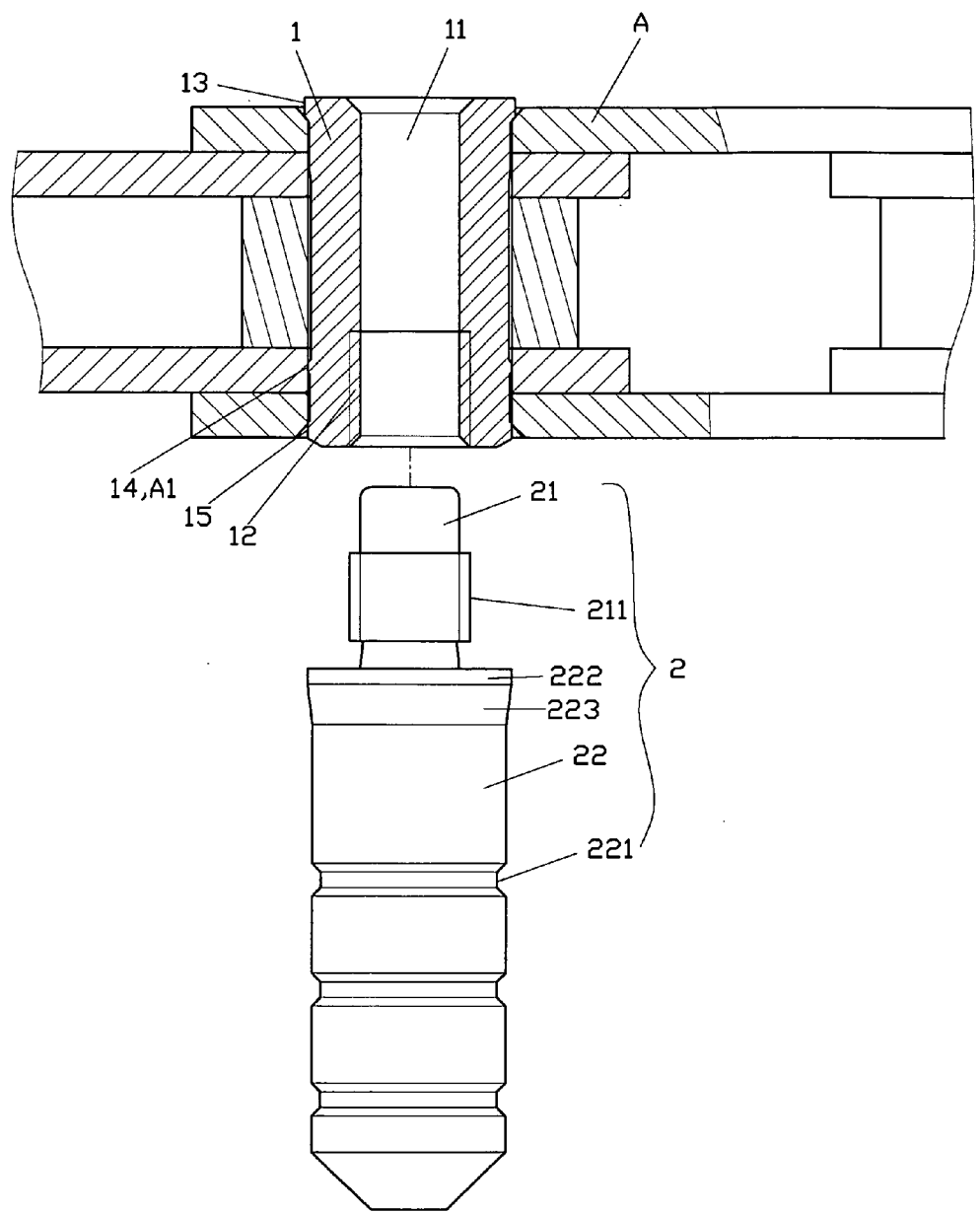
FIG. 4 is a side sectional view of the present invention in an operating status.
Figure 5:
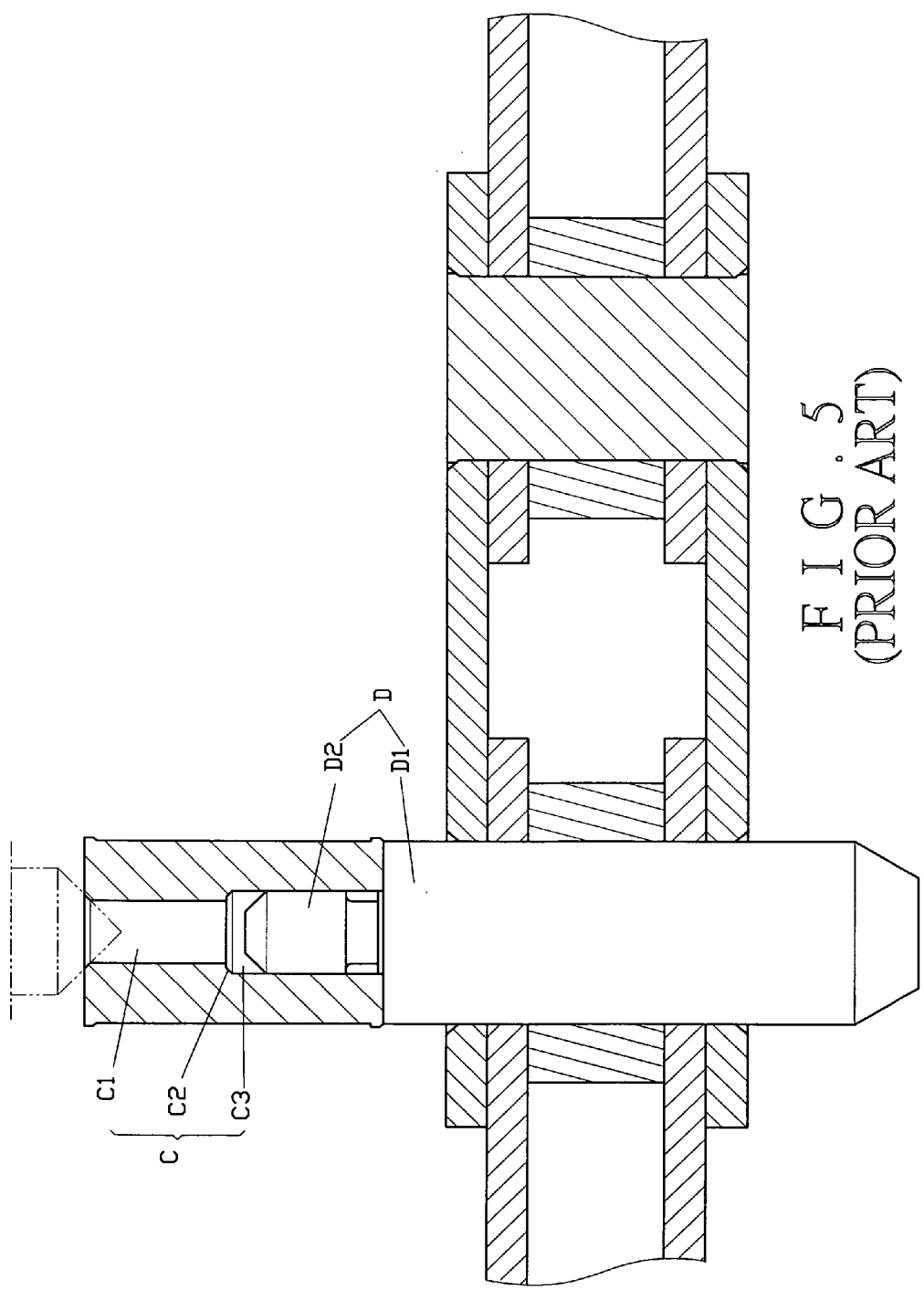
FIG. 5 is a side sectional view of a chain connection method of a prior art.

The passage 11 of the black shaft 1 expands its size when the chain tool B applies force against the passage 11, as shown in FIG. 4, so that the black shaft 1 is secured in the connecting hole A1 of the chain connector A. Because the outer diameter of the first protruding ring 13 is larger than that of the second protruding ring 14 and the third protruding ring 15, the connection will not be loosened or disengaged accidentally. The first protruding ring 13 is secured on the connecting hole A1 and the second protruding ring 14 of the black shaft 1 contacts with the inner wall of the connecting hole A1, which increases the stability of the black shaft 1 within the connecting hole A1. By loosening the guiding section 21 of the guiding bolt 2 from the passage 11 of the black shaft 1, the guiding bolt 2 is able to depart from the black shaft 1.

Screwing the threaded portion 211 and the threaded section 12 together to facilitate the connection of the black shaft 1 and the guiding bolt 2 eliminates unstable connection. Furthermore, the guiding bolt 2 is reusable, which is cost-effective.

What is claimed is:

1. A guiding shaft structure for a chain connector, comprising:

a black shaft, said black shaft comprising a passage with a threaded section therein and a first protruding ring, a second protruding ring and a third protruding ring on an outer surface thereof; and a guiding bolt, said guiding bolt being connected to said threaded section of said black shaft and comprising an insertion section and a guiding section, said insertion section comprising grooves, a circular flange and a guiding surface, said guiding section comprising a threaded portion.

* * * * *